FIG. 1
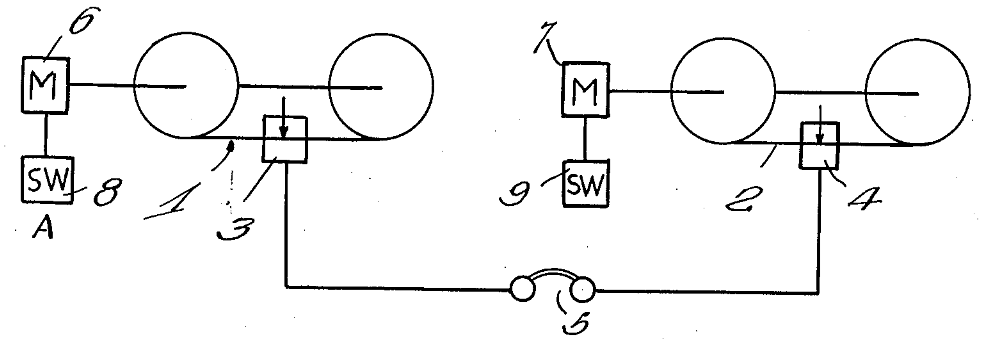
FIG. 2
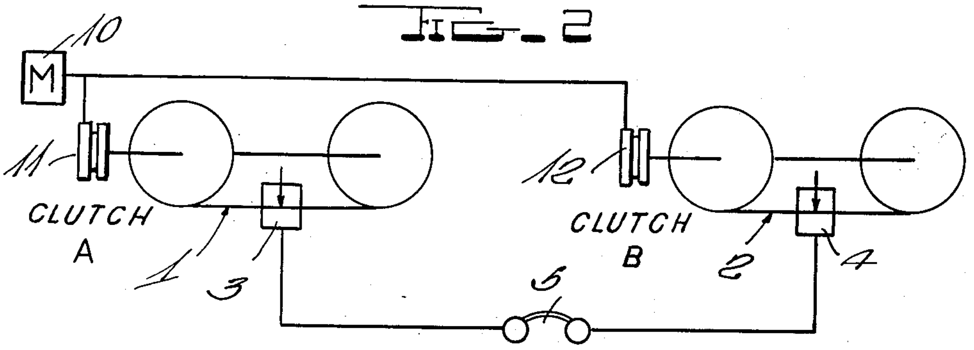
FIG. 3
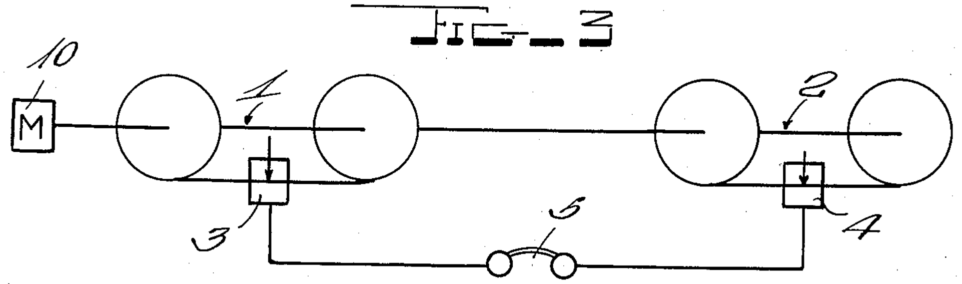
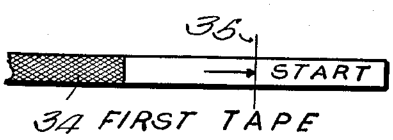
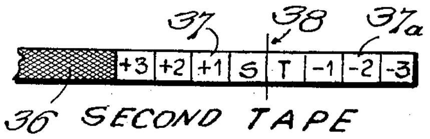
FIG. 4 FIG. 5
INVENTOR
Albert C. Holt,
BY Bernard F. Garvey
ATTORNEY Sept. 25, 1956 A. C. HOLT 2,764,639
INDICIA TAPE CONTROLLING APPARATUS
Filed Nov. 7, 1951 4 Sheets-Sheet 2

INVENTOR
Albert C. Holt,
BY Bernard F. Garvey
ATTORNEY

INDICIA TAPE CONTROLLING APPARATUS

Filed Nov. 7, 1951 4 Sheets-Sheet 3

INVENTOR.
Albert C. Holt,
BY
Bernard J. Garvey
ATTORNEY

Sept. 25, 1956 A. C. HOLT 2,764,639

INDICIA TAPE CONTROLLING APPARATUS

Filed Nov. 7, 1951 4 Sheets-Sheet 4

INVENTOR

Albert C. Holt,

BY

ATTORNEY

United States Patent Office 2,764,639
Patented Sept. 25, 1956

2,764,639

INDICIA TAPE CONTROLLING APPARATUS

Albert C. Holt, Ridgewood, N. J., assignor to International Business Machines Corporation, New York, N. Y., a corporation of New York Application November 7, 1951, Serial No. 255,278

5 Claims. (Cl. 179—100.1)

Figure 6:
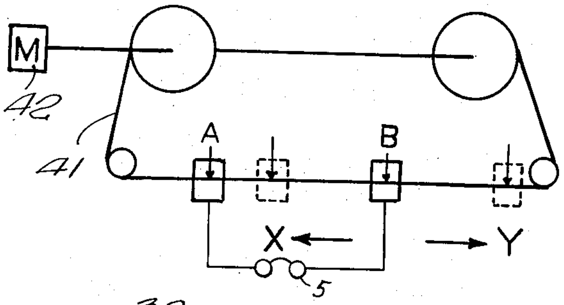

My invention relates broadly to indicia tape controlling apparatus and more particularly to means for accomplishing a time relation change between two recorded information tracks in a recording and reproducing system.

One of the objects of my invention is to provide means for recording and reproducing indicia using tape controlling apparatus in which a time relation change may be effected between two recorded information tracks.

Another object of my invention is to provide means for presynchronizing, simultaneously synchronizing, and/or postsynchronizing indicia on recording and reproducing tape apparatus for accomplishing a time relation change between two recorded information tracks.

Still another object of my invention is to provide means for accomplishing a time relation change between two recorded information tracks on tape apparatus in which independent tape recorders may be operated in a predetermined time sequence for reproducing indicia in a predetermined time relation.

A still further object of my invention is to provide an arrangement of tape reproducing apparatus in which separate tape reproducing devices are provided with independent clutch operated devices with means for independently actuating the clutch drives for selectively controlling the time relation change between two recorded information tracks.

A still further object of my invention is to provide leaders, attached to the tapes of a pair of coacting tape recording equipments, indicating by graduations thereon the relative starting positions for the tapes for the purpose of accomplishing a predetermined time relation between the two recorded information tracks.

Still another object of my invention is to provide an arrangement of dual channel records on the tape of a reproducing apparatus whereby the records are driven at the same speed and drift eliminated and a time relation change accomplished between the two recorded information tracks by providing a loop in the tape where the magnitude of the loop may be selectively varied for presenting the two channel records thereon to reproducing heads at different phase positions for accomplishing a time relation change between the two recorded information tracks.

Still another object of my invention is to provide means in a dual tape recorder for varying the phase relation of the pickup heads with respect to the indicia on the tape for so changing the spacial relation of the pickup heads as will permit reproduction of the different records in selected time relation.

A further object of my invention is to provide an electric control circuit arrangement for electronically controlling through a single control means the time sequence of operation of two tape reproducers for accomplishing a time relation change between two recorded information tracks.

Figures 7, 8:
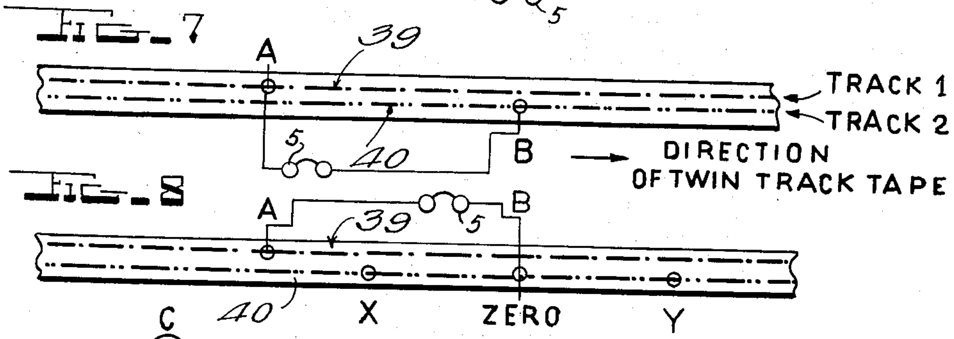
Figure 9:
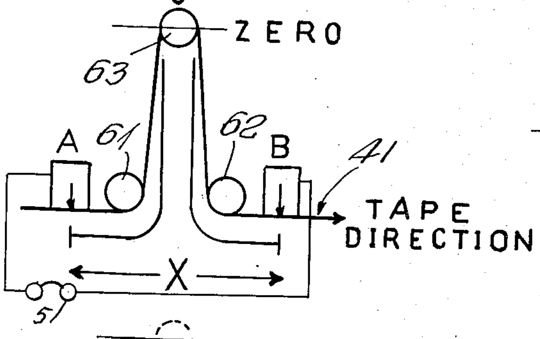
Figure 11:
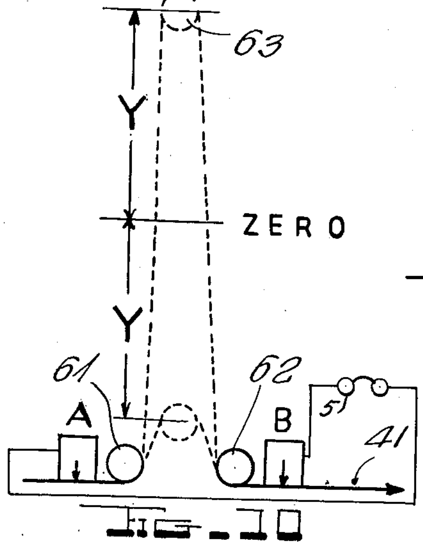
Figure 10:
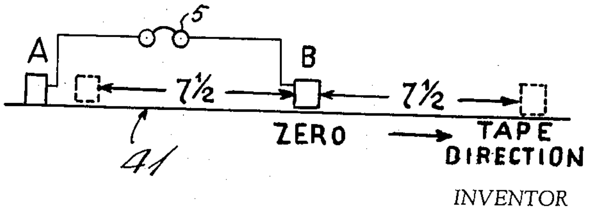
Figure 12:
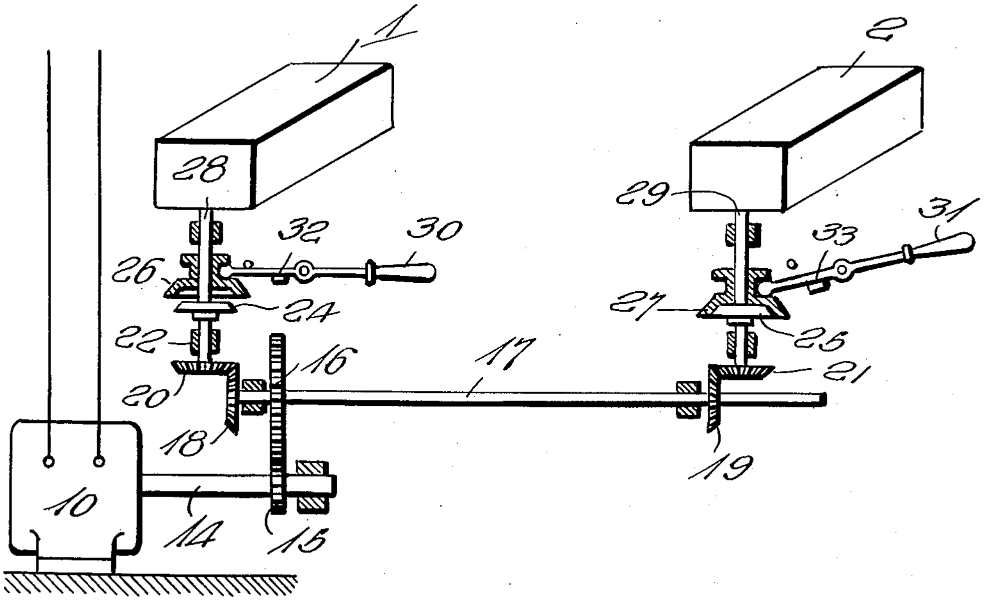
Figure 13:
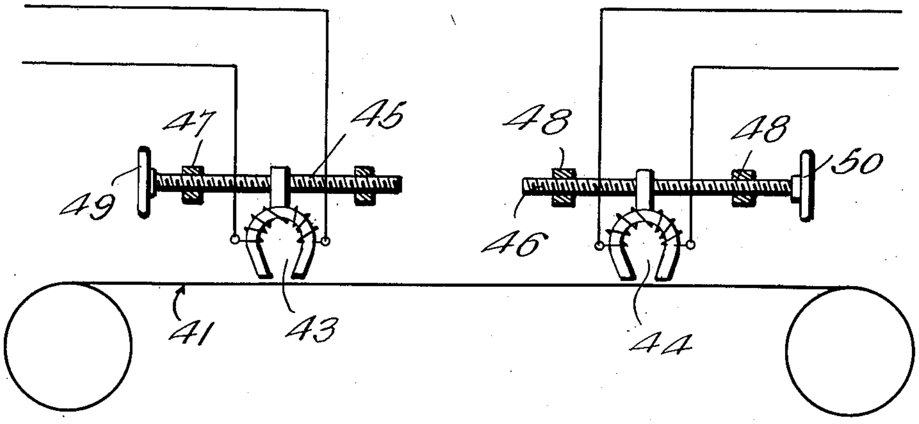
Figure 14:
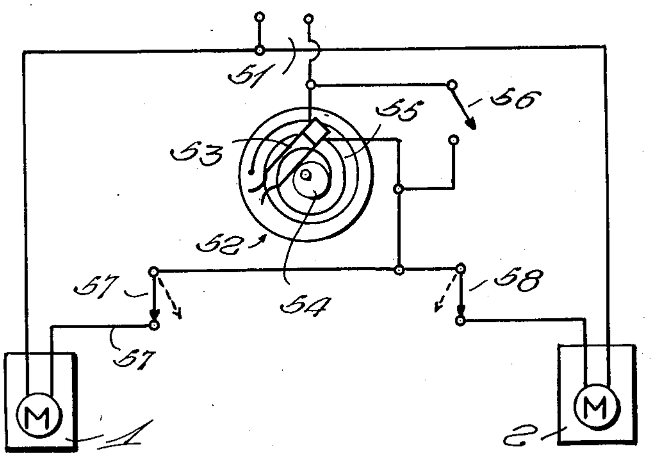
Figure 15:
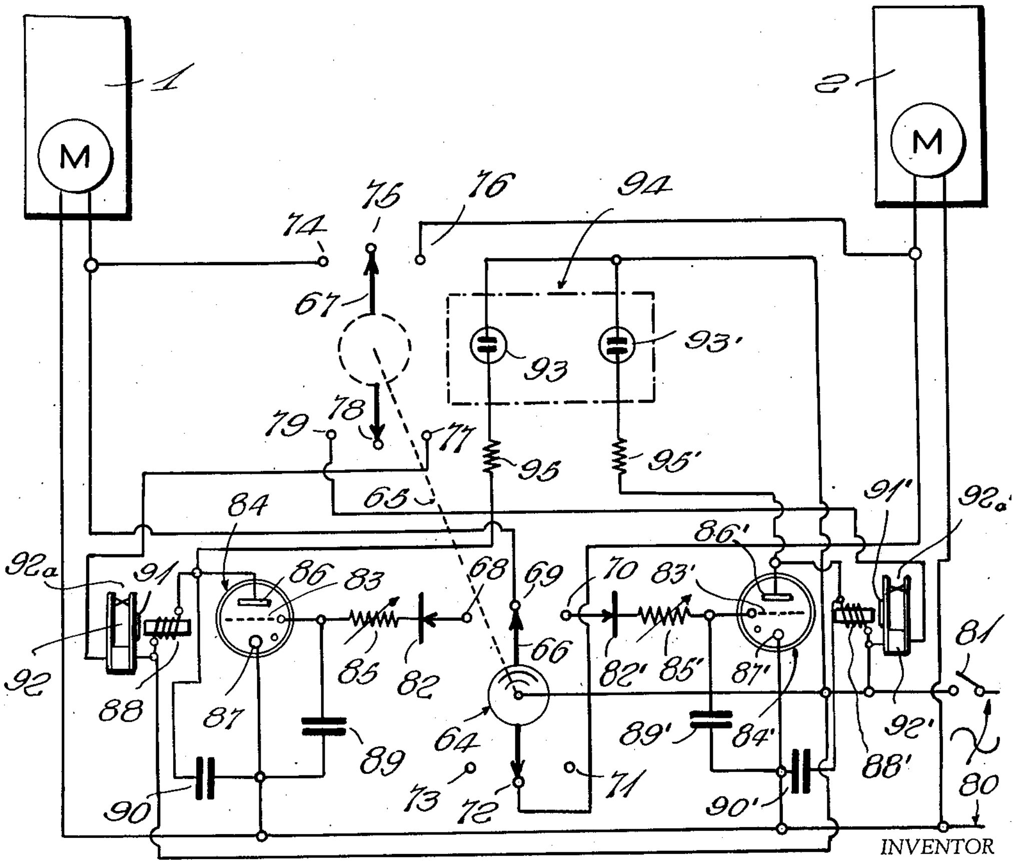

Other and further objects of my invention reside in the arrangements for phasing and dephasing the reproduction of indicia on tape controlling apparatus as set forth more fully in the specification hereinafter following by referring to the accompanying drawings, in which:

Figure 1 diagrammatically shows means which I provide for reproducing indicia from tapes of two recorders employing switching means for momentarily turning off the drive motor of either tape reproducer for causing one record to lag and the other record to advance with respect to the original time relation between the recorded information tracks; Fig. 2 diagrammatically shows another method for independently controlling the lag and lead positions of two recorded information tracks by clutching and declutching the two reproducers in a predetermined time relation; Fig. 3 diagrammatically illustrates means for accomplishing a time relation change between two recorded information tracks in which I provide tape leaders containing graduations for indicating the relative starting positions for the tapes for correspondingly adjusting the time relation for the reproduction of the two recorded information tracks; Fig. 4 is a fragmentary view of the tape leader provided on one of the reproducing machines of Fig. 3 and showing the scale mark thereon for setting the tape upon a predetermined starting position; Fig. 5 is a fragmentary view of the leader provided on the coacting reproducing machine in the arrangement of Fig. 3 for adjusting the tape to a predetermined reproducing position with respect to the tape on the co-acting reproducing machine for accomplishing a time relation change between the two recorded information tracks; Fig. 6 diagrammatically shows a further arrangement for accomplishing a time relation change between two recorded information tracks using a dual record on a single tape with means for adjusting the position of the reproducing heads along the two related tracks on the tape; Fig. 7 schematically shows a dual record tape and the related positions of the reproducing heads with respect thereto; Fig. 8 schematically shows a dual record, similar to that shown in Fig. 7, with the reproducing heads adjustable longitudinally of the tape whereby the heads may be advanced or retarded from a normal synchronized position of presynchronizing or postsynchronizing the reproduction of indicia in one channel with respect to indicia in the adjacent channel; Fig. 9 diagrammatically shows a further means for changing the time relation between two recorded information tracks on a dual record tape in which an adjustable loop is provided in the tape for changing the effective position of the tracks containing the indicia with respect to the co-acting reproducing heads; Fig. 10 schematically illustrates the manner of changing the effective length of the loop tape shown in Fig. 9 for correspondingly changing the phasing and dephasing of the reproduced indicia from the dual record; Fig. 11 diagrammatically illustrates the effect of adjusting the length of the loop shown in Figs. 9 and 10; Fig. 12 schematically shows a mechanism for carrying out the form of my invention diagrammatically shown in Fig. 2 by an arrangement of selectively operated clutches individual to each reproducing apparatus; Fig. 13 schematically illustrates a mechanism for presynchronizing, synchronizing, and/or postsynchronizing the indicia on a dual record tape as diagrammatically illustrated in Figs. 6–8; Fig. 14 illustrates a further modified arrangement for presynchronizing, simultaneously synchronizing and/or postsynchronizing the records of two independent tape machines according to my invention; and Fig. 15 diagrammatically and schematically shows a circuit arrangement which I provide for controlling through a single adjustable controller the presynchronizing, simultaneous synchronizing, and/or the postsynchronizing of the records on two tape reproducing equipments in accordance with my invention.

My invention is directed to means for accomplishing a time relation change between two recorded information tracks such as perforated tape records, light ray control records arranged to be scanned by photo-electric cells, and also magnetic tape records. The apparatus of my invention is applicable to many arts, particularly in the design and construction of statistical machines, computers, electronic counters, and equipments functioning upon the principles of accumulation of statistics for mathematical computation. One application of my invention which I have found particularly effective resides in the use of the means of my invention in bi-lingual listening devices for the teaching of languages as set forth more fully in the co-pending application of Leon E. Dostert, Serial No.255,211, filed November 7, 1951, for Method and Apparatus for Teaching Languages. My invention provides means for accomplishing a time relation change between two recorded information tracks whereby indicia may be reproduced in relationships which are presynchronized, simultaneously synchronized, and/or postsynchronized. I accomplish the phasing and dephasing relationship of the two recorded information tracks by a variety of means which facilitates reproduction of the indicia in leading, simultaneous, or lagging selective relationship as set forth more fully in the detailed description hereinafter following.

Referring to the drawings in more detail, indicia recorded on two tape recorders represented at 1 and 2 are reproduced through reproducing heads 3 and 4 in the telephone circuit represented at 5. Each tape reproducing machine is individually driven by motors represented at 6 and 7. Each driving motor is separately controlled through a starting and stopping switch diagrammatically illustrated at 8 and 9. Reproducing machine 1 carrying certain indicia is independently controllable with respect to reproducing machine 2 carrying other indicia. Assuming motors 6 and 7 both running, motor switch 9 may be turned off momentarily bringing reproducing machine 2 to a stop while reproducing machine 1 continues to operate whereby indicia from reproducing machine 2 is made to lag by the original timing in relation to the indicia reproduced from reproducing machine 1. Likewise, if switch 8 is turned off momentarily the relative position of indicia from reproducing machine 2 compared to indicia from reproducing machine 1 is advanced. When applying the principles of my invention to language instruction, it will be understood that the language record reproduced on one reproducing machine may thus be advanced or retarded with respect to the language record reproduced from the other reproducing machine. Where one language record is a translation of the other language record, the means of my invention enables the student to selectively change the time relation between the two language reproductions. This allows different students to make a setting of a lag between a known and unknown language which best suits their ability to comprehend and assimulate the lesson material.

Inasmuch as two tape transports operating independently have the tendency to run at different speeds, I may utilize the arrangement shown diagrammatically in Fig. 2 in which both transports 1 and 2 are driven by one motor 10 and have independent clutches represented at 11 and 12. Fig. 12 shows a schematic arrangement for carrying out the arrangement of Fig. 2 wherein the single motor 10 drives shaft 14 carrying gear 15 which meshes with gear 16 on shaft 17. Shaft 17 carries bevel gears 18 and 19 which respectively mesh with bevel gears 20 and 21 carried by vertically extending shaft 22 and 23. Shafts 22 and 23 drive clutch discs 24 and 25 with respect to which clutch members 26 and 27 may be engaged or disengaged for driving or interrupting the drive of the drive shafts 28 and 29 to the reels of the magnetic reproducers 1 and 2. The clutch members 26 and 27 are gravitated into engagement with the revolving clutch discs 24 and 25 as represented for example by the arrangement of clutch for magnetic reproducer 2. The clutch actuators both include manually operative pivoted levers 30 and 31 weighted at 32 and 33 for normally maintaining the levers in gravitated position as shown for example by lever 31 in which clutch member 27 is engaged with revolving clutch disc 25. If a dephasing of the reproductions from the magnetic records is required the driving of the magnetic reproducer which is to be retarded is interrupted by manually depressing the associated pivoted lever as shown for example by the position of lever 30. Hence the magnetic record on reproducer 1 is halted while the magnetic record on reproducer 2 continues bringing about the required dephasing. By this means the magnetic records of the known and unknown languages may be presynchronized, or simultaneously synchronized, and/or postsynchronized according to the will of the student.

In Fig. 3 I have shown a means for accomplishing a time relation change between two recorded information tracks in which a tape leader 34 is applied to the end of the tape provided in reproducing machine 1 as shown in Fig. 4 with the "zero" starting position indicated on the tape leader as represented at 35 in Fig. 4. The tape record in reproducing machine 2 is also provided with a tape leader as represented at 36 in Fig. 5. The tape leader 36 is calibrated and carries sets of graduations 37 and 37*a* which progressively increase from the "zero" or starting position 38. That is the graduations to the right of the starting position 38 are designated —1, —2, —3, etc., and the graduations to the left are designated +1, +2, +3, etc. These calibrations enable the two tapes to be preset on the reproducing machines 1 and 2 in positions in which the reproduction of the two recorded information tracks is accomplished in predetermined time relation.

In Figs. 6, 7 and 8 I have illustrated the manner in which two related information tracks 39 and 40 are reproduced from a single tape 41 rather than from two tapes. The driving motor 42 operates the dual record tape 41. The advantage of providing two related tracks or channels on a single tape rather than on two separate tapes is that both tracks or channels travel at the same speed and there can be no drift. There is a predetermined timing or spacing on the tape between the two heads A and B. This spacing is indicated diagrammatically in Fig. 7. As represented in Fig. 8 with head B in "zero" position the original timing may be maintained. Head B may then be adjusted from X to Y allowing for the advancing or retarding of the pickup from channel 40.

In Figs. 9, 10 and 11 the record tape 41 carries two channels or record tracks and the distance between reproducing heads A and B is fixed. The tape 41 is lead around the guide rolls represented at 61 and 62 and over the idler roll 63. As represented in Fig. 9 the zero or recording distance on the tape between the reproducing heads A and B is represented by the distance X. This distance is approximately eight inches for a 7½" tape speed. As shown in Fig. 10 idler roller 63 is adjustable through the distance +Y from the zero position to obtain the required phasing or dephasing of the information in the two tracks or channels on the tape 41. This is equivalent to moving the reproducing head B through a distance +7½" as represented in Fig. 11. The split telephone reproducing circuit represented at 5, as explained in connection with Figs. 1–5, is electrically connected with the two heads A and B in the forms of my invention illustrated in Figs. 6–11, as heretofore set forth.

The magnetic assembly for carrying out such an adjustment is illustrated in Fig. 13 which shows schematically one of the means of carrying out the principle for accomplishing phase adjustment diagrammatically shown in Figs. 6–8 on a twin track reproducer, by shifting one reproducing head A with respect to the other reproducer head B. Channel 39 of magnetic reproducer A designated 43 and channel 40 activates magnetic reproducer B shown at 44. The reproducing heads 43 and 44 are suspended on micrometer screws 45 and 46 revolvable in mounting supports 47 and 48, respectively, and rotatable by adjustment knobs 49 and 50 for varying the spacial relation of the heads 43 and 44 and correspondingly changing the phase selection between the two records 39 and 40 for thus presynchronizing, simultaneously reproducing, and/or postsynchronizing the indicia in the twin channel on the record 41.

In Fig. 14, I have shown magnetic tape reproducing machines 1 and 2 with the driving motors thereof controlled through a switching and timing circuit from the source 51. A spring actuated snap control timer switch 52 has contacts 53 arranged in series with the two motor circuits in the respective reproducing machines 1 and 2. The contacts 53 are normally closed and are subject to be opened by movement of cam 54 after the lapse of a given time interval after having been spring wound and set by means of a coil spring represented at 55. A shunting switch 56 is connected across contacts 53 for disabling the circuit through contacts 53. Each motor circuit in the magnetic tape reproducing machines 1 and 2 is provided with a series connected selector switch shown at 58 and 58, respectively. All switches 56, 57 and 58 and contacts 53 are closed for normal running condition of the motors of the magnetic tape reproducers 1 and 2. Switch 56 is opened to stop both motors, and the spring 55 of timer switch 52 then wound so as to move cam 54 to a position opening contacts 53 after a selected time lapse when it is desired to adjust the phasing of the reproduction from the two magnetic records. When the spring actuated timer 52 is set by winding the spring 55 for moving the cam 54 of the switch to a position in which cam 54 will open contacts 53 after the lapse of a selected set time interval, the selector switch 57 or 58 is closed which results in the running of the motor in the magnetic reproducing machine that is selected. Thus the selected recorder is advanced to the desired phased position and the other selector switch and switch 56 may then be closed for operating both motors simultaneously, but with the tape records in the proper phase relation.

In Fig. 15, I have shown a further method of controlling the phasing of the known language and unknown language records on the magnetic tape reproducing machines 1 and 2, by which the respective motors are retarded or advanced with respect to each other under control of a single switch knob shown at 64. Switch knob 64 connects with shaft 65 which carries double-ended switch blades 66 and 67 in ganged relation. Blade 66 sweeps contacts 68, 69, 70, 71, 72 and 73 while switch blade 67 sweeps contacts 74, 75, 76, 77, 78 and 79. The supply source for the motors of the magnetic tape reproducing machines 1 and 2 connects at 80 and excites the motor circuits through control switch 81. With the gang switches in the vertical positions illustrated, the motors of magnetic tape reproducing machines 1 and 2 are both driven simultaneously. The circuit may be traced from control switch 81 through switch blade 66 and contact 69 to the driving motor of magnetic tape reproducing machine 1 returning to the opposite side of source 80; and through switch blade 66 and contact 72 to the driving motor in magnetic tape reproducing machine 1 from which the circuit is completed to the opposite side of source 80. When, however, it is desired to retard the motor in magnetic tape reproducing machine 2, while maintaining constant drive of the motor in magnetic tape reproducing machine 1, knob 64 is turned counterclockwise to the position where blade 66 makes connection with contact 68 conducting alternating current from source 80 through the rectifier element 82, such as selenium oxide and the like, for supplying direct current pulses to the control element 83 of cold cathode tube 84 through adjustable regulating resistor 85. The cold cathode tube 84 includes anode 86 and cold cathode 87 with the input circuit between control element 83 and cold cathode 87, completed from cold cathode 87 to the opposite side of power source 80. The output circuit starting from source 80 goes through relay coil 88 to anode 86, from which it is completed through the cold cathode tube 84 to cathode 87 and the opposite side of source 80.

Charge regulating condensers 89 and 90 are provided in the input and output circuits as shown. Relay winding 88 controls armature 91 associated with the contact spring assembly 92 which carries contacts **92*a* which are normally closed and which complete the circuit to the motor in magnetic tape reproducing machine 1, via contacts 92*a*, contact 77, switch blade 67 and contact 74 to the motor in reproducer 1, from which the circuit is completed to the opposite side of the power source 80. When knob 64 is turned counterclockwise, the motor circuit to the motor of reproducer 2 is broken thereby stopping that motor while the motor circuit to the motor of reproducer 1 is again established through the circuit just described. Simultaneously, when knob 64 is turned condenser 89 and resistor 85 provide a time delay, determined by their values, whereby cold cathode tube 84 operates after a predetermined time thereby energizing winding 88, opening contacts 92*a*, and causing a gaseous discharge indicating tube 93 to glow. The motor circuit of reproducer 1 is thereupon opened by contacts 92*a* so that the motor of reproducer 1 is also stopped. When the gaseous indicator 93 glows an indication is given that knob 64 should be returned to the original position so that both aforesaid motors then operate together as originally described, the tape of reproducer 1 having been advanced with respect to the tape of reproducer 2 a linear distance which is a function of the time delay of the condenser 89 and the resistor 85 in controlling the cold cathode tube 84** and its associated circuits.

The motor in magnetic tape reproducer 2 is controlled in an identical manner with that of the motor in magnetic tape reproducer 1 by moving knob 64 clockwise for completing the circuit from switch 81 through blade 66 and contact 70 to the components of the cold cathode tube circuit shown to the right to knob 64. Because all of these components are symmetrical with the components shown to the left of the knob 64 I have represented corresponding elements by primed reference characters 82′—93′ and 95′ which are similar for corresponding parts 82—93 and 95. When knob 64 is moved clockwise, switch blade 67 connects with contacts 76 and 79 completing the circuit through contacts **92*a*′ to the power source 80. The motor in the magnetic tape reproducer 2 is thereby controlled in a similar manner to that of reproducer 1 while the circuit to the motor of reproducer 1 is broken stopping that motor. The single knob control 64** provides a simple means for an operator to quickly presynchronize, simultaneously operate, and/or post synchronize the magnetic records for facilitating instruction.

In all forms of my invention to the electrical circuit between the reproducing heads shown at 3 and 4 in Figs. 1–3 and A and B in Figs. 6–11, and at 43 and 44 in Fig. 13 are electrically connected with the reproducing means such as the telephone circuit shown at 5 in Figs. 1–3 and the circuit and connection thereto from the reproducing heads maintained while the records are phased and dephased with respect to each other, that is presynchronized, simultaneously synchronized or postsynchronized as hereinbefore explained.

As heretofore pointed out, the essential feature of my invention resides in the provision of means capable of accomplishing a time relation change between two recorded information tracks. I have described certain means for carrying out my invention, but I realize that modifications may be made, and I desire that it be understood that no limitations upon my invention are intended other than may be imposed by the scope of the appended claims.

What I claim and desire to secure by Letters Patent of the United States is as follows:

1. A binaural, bilingual system comprising a magnetic tape having recorded, in one channel extending longitudinally thereof, phrases of an unknown language and, in a second similar channel laterally spaced from said first channel, corresponding translated phrases in a known language, a pair of reproducing heads associated individually with said channels, driving means for said tape, a telephone headset including a pair of reproducing receivers, one of said receivers being connected to one reproducing head for audibly reproducing the recorded language phrases of one channel for reception by one ear of a listener and the other of said receivers being connected to the other reproducing head for audibly reproducing the recorded language phrases of the other channel for reception by the other ear of the listener, and means for appreciably varying the relative positions of one of said reproducing heads and its cooperating channel longitudinally of the tape to permit corresponding phrases of the known and unknown languages to be received binaurally in simultaneous, lagging or leading relationships as desired, while maintaining the continuity of the circuit between the reproducing heads and the receivers.

2. A binaural, bilingual system as set forth in claim 1, in which there are additional means for also varying the position of the other of said reproducing heads and its cooperating channel longitudinally of the tape where said means are each independently and selectively controllable.

3. A binaural, bilingual system as set forth in claim 1 in which said means for appreciably varying the relative positions of one of said reproducing heads and its cooperating channel longitudinally of the tape consists of a pair of guide rolls intermediate said heads for guiding said magnetic tape, an idler roll intermediate said guide rolls, said idler roll having said tape looped therearound, the axis of said idler roll being laterally displaceable from a position coplanar with a plane passing through the axis of said guide rolls to a position substantially displaced from said plane.

4. A binaural, bilingual system as set forth in claim 1 in which said means for appreciably varying the relative positions of one of said reproducing heads and its cooperating channel longitudinally of the tape consists of a member engaging said tape as it passes between said heads for displacing said tape in a loop out of alignment with the normal path of travel of the tape between said heads.

5. A binaural, bilingual system as set forth in claim 1 in which said means for appreciably varying the relative positions of one of said reproducing heads and its cooperating channel longitudinally of the tape consists of a member engaging said tape as it passes between said heads for displacing said tape in a loop out of alignment with the normal path of travel of the tape between said heads, where said loop is variably adjustable in a plane which is normal to the plane of the path of movement of said tape.

References Cited in the file of this patent

UNITED STATES PATENTS

| | | |
|---|---|---|
| 995,680 | Jungren | June 20, 1911 |
| 1,308,065 | Hajek | July 1, 1919 |
| 1,833,015 | Battey | Nov. 24, 1931 |
| 1,949,409 | Cohen | Mar. 6, 1934 |
| 2,105,318 | Goldsmith | Jan. 11, 1938 |
| 2,209,157 | Glunt | July 23, 1940 |
| 2,273,755 | Hardenberg | Feb. 17, 1942 |
| 2,439,446 | Begun | Apr. 13, 1948 |
| 2,561,338 | Camras | July 24, 1951 |
| 2,583,983 | Arndt | Jan. 29, 1952 |
| 2,629,784 | Daniels | Feb. 24, 1953 |